(12) United States Patent
Bashyam et al.

(10) Patent No.: US 10,256,978 B2
(45) Date of Patent: *Apr. 9, 2019

(54) CONTENT-BASED ENCRYPTION KEYS

(71) Applicant: QUEST SOFTWARE INC., Aliso Viejo, CA (US)

(72) Inventors: Murali Bashyam, Fremont, CA (US); Tarun K. Tripathy, Newark, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,198

(22) Filed: Nov. 7, 2017

(65) Prior Publication Data

US 2018/0227127 A1 Aug. 9, 2018

Related U.S. Application Data

(63) Continuation of application No. 14/722,854, filed on May 27, 2015, now Pat. No. 9,813,248.

(51) Int. Cl.
| | |
|---|---|
| *H04L 9/08* | (2006.01) |
| *H04L 9/32* | (2006.01) |
| *G06F 11/10* | (2006.01) |
| *G06F 21/32* | (2013.01) |
| *G06F 21/60* | (2013.01) |

(52) U.S. Cl.
CPC ........ *H04L 9/3242* (2013.01); *G06F 11/1004* (2013.01); *G06F 21/32* (2013.01); *G06F 21/602* (2013.01); *H04L 9/0866* (2013.01)

(58) Field of Classification Search
CPC ...... H04N 7/1675; H04N 7/163; H04N 21/44; H04N 7/165; H04N 7/162
USPC .......................................................... 380/28
See application file for complete search history.

(56) References Cited

U.S. PATENT DOCUMENTS

| | | | |
|---|---|---|---|
| 9,390,101 B1 * | 7/2016 | Schneider ......... | G06F 17/30156 |
| 2012/0017275 A1 * | 1/2012 | Harmonen .............. | G06F 21/56 726/24 |

* cited by examiner

*Primary Examiner* — Evans Desrosiers
(74) *Attorney, Agent, or Firm* — Maschoff Brennan

(57) ABSTRACT

Techniques and mechanisms described herein facilitate the encryption of content using content-based encryption keys. According to various embodiments, data stream may include one or more data chunks. A client machine may apply a hash function to a data chunk to determine a fingerprint value. A cryptographic protocol shared with a remote server may be applied to the fingerprint value to determine a data chunk encryption key. The data chunk encryption key may be used to encrypt the data chunk, and the encrypted data chunk may be sent to the remote server for storage.

20 Claims, 8 Drawing Sheets

CONTENT-BASED ENCRYPTION KEYS

CROSS-REFERENCE TO RELATED APPLICATIONS

This application is a continuation of U.S. patent application Ser. No. 14/722,854, filed on May 27, 2015, the entirety of which is incorporated by reference herein.

TECHNICAL FIELD

The present disclosure relates generally to data storage, and more specifically to the operation of client devices in communication with network-accessible or network-attached storage systems.

BACKGROUND

Data is often stored in storage systems that are accessed via a network. Network-accessible storage systems allow potentially many different client devices to share the same set of storage resources. A network-accessible storage system can perform various operations that render storage more convenient, efficient, and secure. For instance, a network-accessible storage system can receive and retain potentially many versions of backup data for files stored at a client device. As well, a network-accessible storage system can serve as a shared file repository for making a file or files available to more than one client device.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for encrypting a data chunk. According to various embodiments, a fingerprint value for a designated data chunk may be determined by applying a hash function to the designated data chunk via a processor at a client machine. A data chunk encryption key for encrypting the data chunk may be constructed by applying a cryptographic protocol to the fingerprint value. The cryptographic protocol may be shared with a remote server. The data chunk may be encrypted with the data chunk encryption key to produce an encrypted data chunk. The encrypted data chunk may be transmitted to the remote server for storage via a communications interface at the client machine.

In some embodiments, a data stream may be parsed into a plurality of data chunks that include the designated data chunk. The data stream may be parsed by applying a rolling hash function that produces a respective checksum value for each of the plurality of data chunks. A respective data chunk encryption key may be constructed for each of the plurality of data chunks.

According to various embodiments, the cryptographic protocol may include a secret shared between the client machine and the remote server. Constructing the data chunk encryption key may involve combining the fingerprint value with one or more secret strings that are pre-negotiated between the client machine and the remote server. Alternately, or additionally, constructing the data chunk encryption key may involve determining a hash based message authentication code based on the fingerprint value.

In some implementations, the fingerprint may be transmitted to the remote server via the communications interface. A data chunk status message may be received from the remote server indicating whether the designated data chunk is stored on the remote server. The designated data chunk may be transmitted to the remote server for storage when it is determined that the designated data chunk is not stored on the remote server.

BRIEF DESCRIPTION OF THE DRAWINGS

The disclosure may best be understood by reference to the following description taken in conjunction with the accompanying drawings, which illustrate particular embodiments of the present invention.

DESCRIPTION OF EMBODIMENTS

Figure 1:
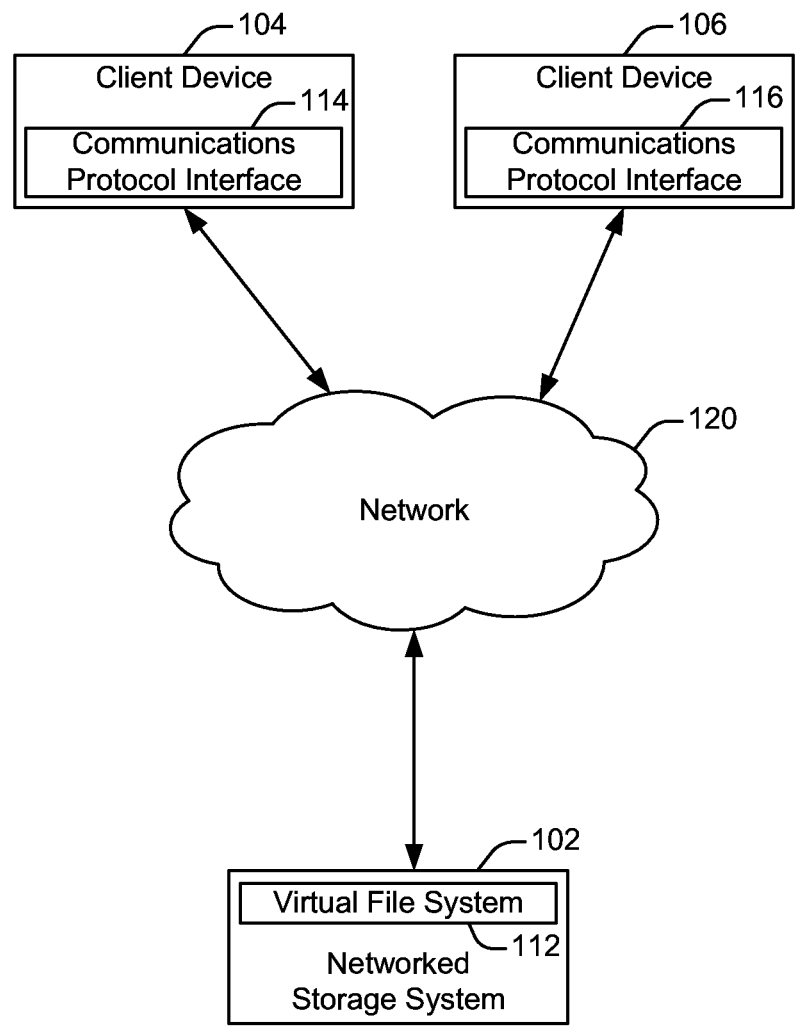
FIG. 1 shows an example of a network storage network storage arrangement, arranged in accordance with one or more embodiments.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate content-derived encryption keys for encrypting data. A data stream may be divided into one or more data chunks. A fingerprint may be generated for each data chunk via a hashing function. Then, a chunk-specific encryption key may be generated by applying a mathematical function to the fingerprint value. For instance, the fingerprint may be padded with a secret string, and the result may be XOR'd with itself a designated number of times. In this way, two different endpoints may be able to separately arrive at the same chunk-specific encryption key without exchanging the keys. The chunk-specific encryption key may be used to encrypt the chunk for data transmission and/or data storage.

EXAMPLE EMBODIMENTS

According to various embodiments, data at a client device may be transmitted to a networked storage system for storage. At least some of the data may be stored on the networked storage system in a deduplicated state.

In some implementations, data may be deduplicated by first dividing a data stream into chunks using a parser and then computing a fingerprint for each chunk using a fingerprinting algorithm. In some embodiments, a fingerprinting algorithm is a procedure that maps an arbitrarily sized data item (such as a chunk of data) to a much shorter bit string, its fingerprint. This fingerprint may be used to identify the original data, just as human fingerprints uniquely identify people. This fingerprint may be used for data de-duplication purposes. For instance, the fingerprint may be used to quickly determine whether a data chunk is already stored on a storage system.

In some instances, data may be deduplicated at the networked storage system. For instance, the networked storage system may review data to determine whether it matches other data stored on the storage system. When a duplicate is found, the networked storage system may eliminate duplicate data chunks and update a reference count to track the number of copies of the duplicated data.

According to various embodiments, data may be deduplicated at the client device. For instance, a data stream designated for storage on the networked storage system may be parsed at the client device using the same parser that exists on the networked storage device. The parser may break the data stream into one or more data chunks, which may be fingerprinted using the same fingerprinter that is used at the networked storage system. The client device may then consult with the networked storage system to determine whether a chunk is already stored at the networked storage system before transmitting the chunk over the network. For instance, the client device may communicate with the networked storage system via custom communications protocol semantics associated with a custom communications protocol.

In some implementations, data may be stored at a networked storage system and/or transmitted in an encrypted state. For instance, data may be parsed into chunks, and each chunk may be encrypted with a different encryption key. However, conventional approaches to data encryption using chunk-specific encryption keys may present any or all of several drawbacks in deduplication aware replication systems as well as in other computing contexts.

First, in a deduplication aware setup, encrypting each data chunk with a randomly generated key may render deduplication difficult or impossible unless. In such a configuration, the same data chunk encrypted with different randomly generated keys on different client machines would have different encrypted output and thus would not be identified by the system as a duplicate.

Second, in a deduplication aware setup, encrypting each data chunk with a client-generated key for transmission and a server-generated key for storage may mean decrypting and encrypting the same data chunk more than once. For instance, a data chunk may be encrypted with a client-generated key for transmission to the server. The same data chunk may need to be decrypted at the server with the client-generated key and re-encrypted with the server-generated key. The process would then need to be repeated in reverse in order to provide the data chunk back to the client machine upon request.

Third, a data stream may be parsed into potentially many different data chunks, and cryptographic key exchange can be a complex and computationally onerous process. Accordingly, exchanging keys for each data chunk may be infeasible in many computing environments, and particularly those in which a large amount of data is replicated.

According to various embodiments, techniques and mechanisms disclosed herein may allow the source (e.g., client) machine that is sending data and the target (e.g., server) machine that is receiving the data to share the same set of keys such that the source's encrypted data can be processed for deduplication or stored as-is on the target without decryption, re-encryption, or chunk-level key exchange.

According to various embodiments, an encryption key may be derived from a hash value or fingerprint of a data chunk. In this way, identical data chunks would be encrypted identically on different client machines since the hash value or fingerprint for the identical data chunks would be the same on the different client machines. In the deduplication context, the system may be pre-configured to exchange hashes in a secure manner. Accordingly, the normal exchange of hash values as part of the deduplication operations of the deduplication aware replication system would be sufficient for different end-points to learn the key for an encrypted data chunk. Alternatively, a replication target can calculate the hashes and thus the encryption keys itself based on the boundaries of the chunks indicated in a message transmitted between the client machine and the replication target as part of the replication protocol.

According to various embodiments, techniques and mechanisms are described herein with respect to deduplication applications. However, the techniques and mechanisms described are applicable to a wide variety of contexts. For instance, the techniques and mechanisms described herein are applicable to any area in which it is desired to produce chunk-specific encryption keys without performing key-sharing for each chunk-specific encryption key.

FIG. 1 shows an example of a network storage arrangement, arranged in accordance with one or more embodiments. The network storage arrangement shown in FIG. 1 includes a networked storage system 102 in communication with client devices 104 and 106 via a network 120. The client devices are configured to communication with the networked storage system 102 via the communications protocol interfaces 114 and 116. The networked storage system 102 is configured to process file-related requests from the client devices via the virtual file system 102.

According to various embodiments, the client devices and networked storage system shown in FIG. 1 may communicate via a network 120. The network 120 may include any nodes or links for facilitating communication between the end points. For instance, the network 120 may include one or more WANs, LANs, MANs, WLANs, or any other type of communication linkage.

In some implementations, the networked storage system 102 may be any network-accessible device or combination of devices configured to store information received via a communications link. For instance, the networked storage system 102 may include one or more DR4000 or DR6000 storage appliances provided by Dell Computer of Round Rock, Tex.

In some embodiments, the networked storage system 102 may be operable to provide one or more storage-related services in addition to simple file storage. For instance, the networked storage system 102 may be configured to provide deduplication services for data stored on the storage system. Alternately, or additionally, the networked storage system 102 may be configured to provide backup-specific storage services for storing backup data received via a communication link.

According to various embodiments, each of the client devices 104 and 106 may be any computing device configured to communicate with the networked storage system 102 via a network or other communications link. For instance, a client device may be a desktop computer, a laptop computer, another networked storage system, a mobile computing device, or any other type of computing device. Although FIG. 1 shows two client devices, other network storage arrangements may include any number of client devices. For instance, corporate networks often include many client devices in communication with the same networked storage system.

According to various embodiments, the client devices may communicate with the networked storage system 102 via the communications protocol interfaces 114 and 116. Different client devices may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client device may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client device may communicate with a networked storage system using the CIFS protocol. CIFS operates as an application-layer network protocol. CIFS is provided by Microsoft of Redmond Wash. and is a stateful protocol.

In some embodiments, a client device may communicate with a networked storage system using the OST protocol provided by NetBackup.

In some embodiments, different client devices on the same network may communicate via different communication protocol interfaces. For instance, one client device may run a Linux-based operating system and communicate with a networked storage system via NFS. On the same network, a different client device may run a Windows-based operating system and communicate with the same networked storage system via CIFS. Then, still another client device on the network may employ a NetBackup backup storage solution and use the OST protocol to communicate with the networked storage system 102.

According to various embodiments, the virtual file system layer (VFS) 102 is configured to provide an interface for client devices using potentially different communications protocol interfaces to interact with protocol-mandated operations of the networked storage system 102. For instance, the virtual file system 102 may be configured to send and receive communications via NFS, CIFS, OST or any other appropriate protocol associated with a client device.

In some implementations, the network storage arrangement shown in FIG. 1 may be operable to support a variety of storage-related operations. For example, the client device 104 may use the communications protocol interface 114 to create a file on the networked storage system 112, to store data to the file, to commit the changes to memory, and to close the file. As another example, the client device 106 may use the communications protocol interface 116 to open a file on the networked storage system 102, to read data from the file, and to close the file.

In particular embodiments, a communications protocol interface 114 may be configured to perform various techniques and operations described herein. For instance, a customized implementation of an NFS, CIFS, or OST communications protocol interface may allow more sophisticated interactions between a client device and a networked storage system.

According to various embodiments, a customized communications protocol interface may appear to be a standard communications protocol interface from the perspective of the client device. For instance, a customized communications protocol interface for NFS, CIFS, or OST may be configured to receive instructions and provide information to other modules at the client device via standard NFS, CIFS, or OST formats. However, the customized communications protocol interface may be operable to perform non-standard operations such as a client-side data deduplication.

Figure 2:
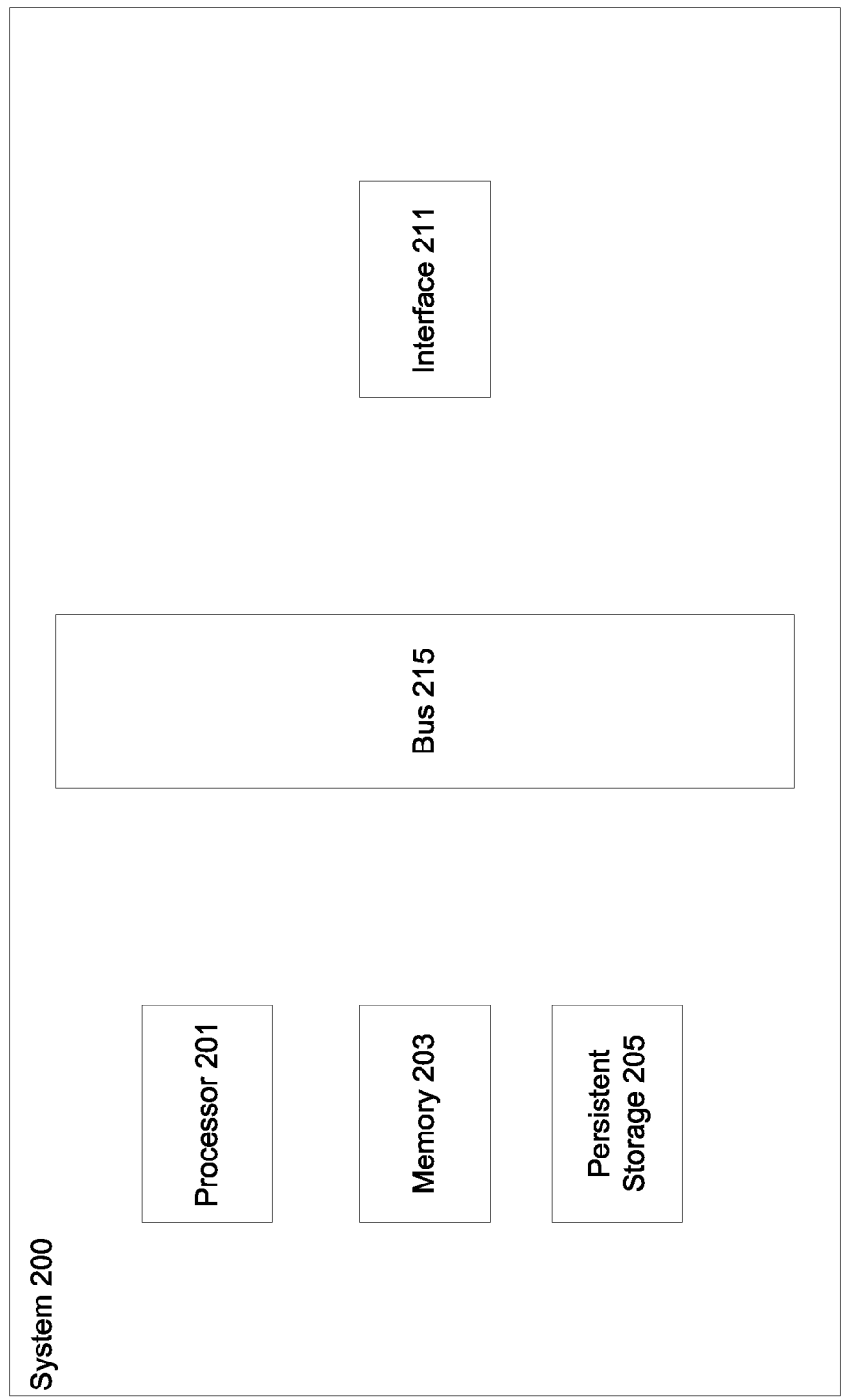
FIG. 2 illustrates a particular example of a system that can be used in conjunction with the techniques and mechanisms of the present invention.

FIG. 2 illustrates a particular example of a system that can be used in conjunction with the techniques and mechanisms of the present invention. According to particular example embodiments, a system 200 suitable for implementing particular embodiments of the present invention includes a processor 201, a memory 203, an interface 211, persistent storage 205, and a bus 215 (e.g., a PCI bus). For example, the system 200 may act as a client device such as the client device 104 or the client device 106 shown in FIG. 1. When acting under the control of appropriate software or firmware, the processor 201 is responsible for such tasks such as generating instructions to store or retrieve data on a remote storage system. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions for operations such as fingerprint generation. The program instructions may control the operation of an operating system and/or one or more applications, for example. The memory or memories may also be configured to store received metadata and batch requested metadata.

Figure 3:
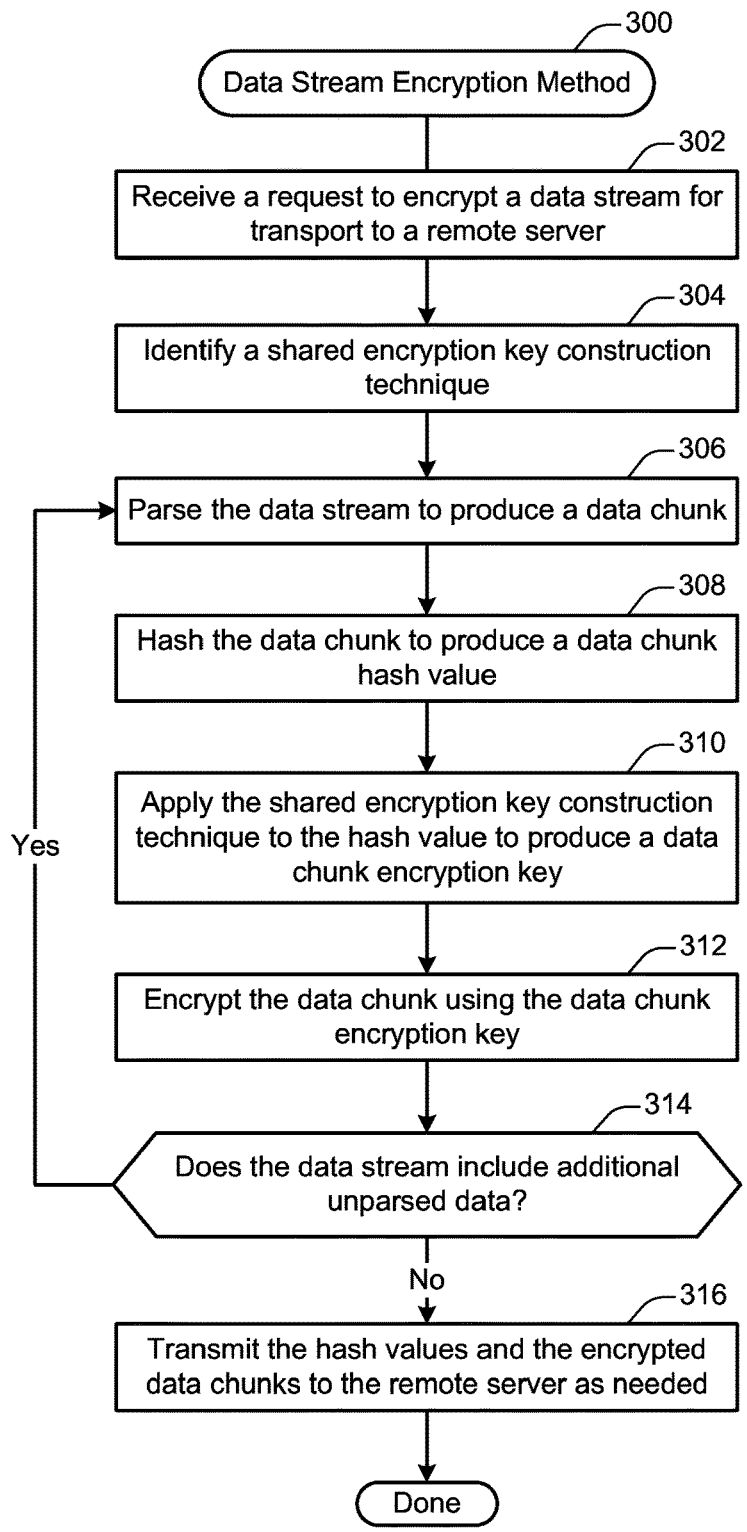
FIG. 3 illustrates an example of method of parsing and encrypting a data stream, performed in accordance with one or more embodiments.

FIG. 3 illustrates an example of a method 300 of parsing and encrypting a data stream, performed in accordance with one or more embodiments. According to various embodiments, the method 300 may be performed at a client machine in communication with a networked storage system. For instance, the method 300 may be performed as part of an operation to transfer the data stream to the networked storage system for storage.

Figure 7:
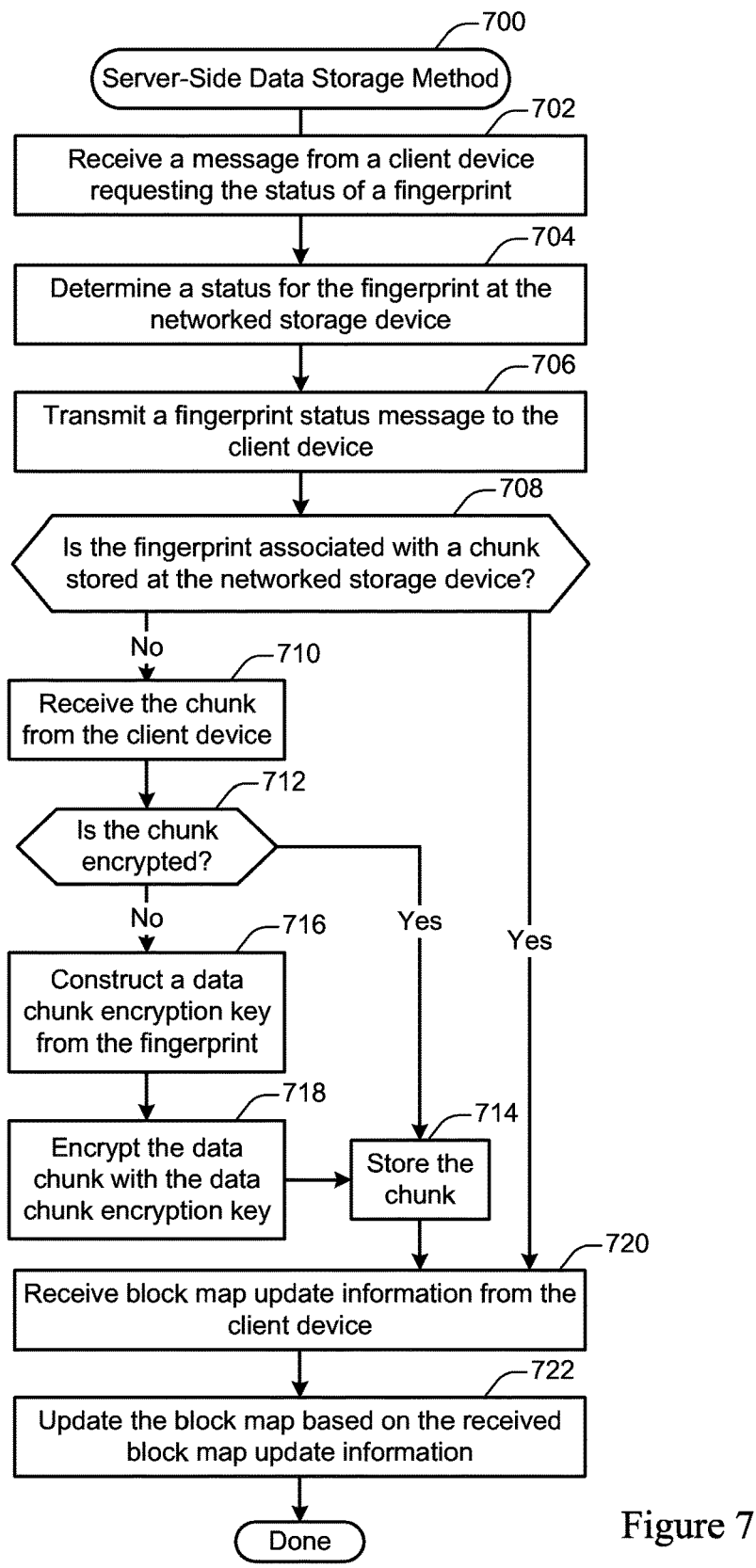
FIG. 7 illustrates a server-side data storage method, performed in accordance with one or more embodiments.

According to various embodiments, operations discussed with respect to the method 300 may be performed in conjunction with operations discussed with respect to FIG. 7. For instance, a data stream may be parsed into chunks at a client machine. The data chunks may be transmitted to a remote server or networked storage device as needed. The data chunks may be encrypted either at the client machine or the networked storage device via an encryption protocol shared between the client machine and the networked storage device. It should be noted that some operations, such as parsing the data stream to produce a chunk, are shown in both FIG. 3 and FIG. 7. However, such operations need not be performed more than once for a given data chunk.

At 302, a request is received to encrypt a data stream for transport to a remote server. According to various embodiments, the request may be received as part of an operation for storing the data stream on the remote server. For instance, the data stream may be transmitted to a remote server such as a networked storage system for the purpose of backing up the data stream or making the data stream available for access by other client devices.

At 304, a shared encryption key construction technique is identified. According to various embodiments, the shared encryption key construction technique may be any technique that can be derived from two sets of information. The first set of information is derived from the chunk itself. The second set of information includes secret keys, strings, or procedures arranged in advance between two network endpoints, where the same keys, strings, or procedures apply to potentially many chunks of data to be encrypted.

According to various embodiments, the first set of information may include a checksum used to construct the data chunk. For instance, a data stream may be parsed using a rolling hash function to determine the chunk boundaries. The final checksum and/or any intermediate values in the rolling hash function may be used as a chunk-specific input to the key-construction technique.

According to various embodiments, the first set of information may include a fingerprint determined for the data chunk. For instance, the data chunk may be hashed to determine a fingerprint value. The fingerprint value may be used for such purposes as chunk identification and deduplication. For example, the fingerprint value may be used to determine whether the data chunk has previously been stored in a storage system. The fingerprint and/or any intermediate values used to construct the fingerprint may be used as a chunk-specific input to the key-construction technique.

According to various embodiments, the second set of information may include one or more pre-arranged secret strings or keys. For example, one or more secret strings or keys may be used to pad information from the first set to construct a value of appropriate length. The one or more secret strings or keys may be exchanged in advance between the two network endpoints. The same one or more secret strings or keys may be used to construct chunk-specific encryption keys for potentially many different data chunks.

According to various embodiments, the second set of information may include one or more pre-arranged key-construction techniques. For example, one key construction technique may involve concatenating a value from the first set of information such as a chunk fingerprint with one or more values from the second set of information such as a set of secret strings. Then, the resulting key input value may be combined with itself a designated number of times by using an XOR mathematical function to produce a payload. Finally, a keyed-hash message authentication code (HMAC) may be applied to the payload to produce the chunk-specific key.

In some implementations, a technique used to produce the chunk-specific key can itself be secret and/or negotiated between the client machine and the remote server. For example, the machines may specify and/or negotiate the specific HMAC to use to produce the key. As another example, the machines may specify and/or negotiate the way in which the inputs are provided to the HMAC, such as an order in which information is concatenated or combined.

In particular embodiments, any pre-arranged key-construction technique may be used so long as it can be arranged in advance and so long as it depends on information in the first and second information sets. For instance, the pre-arranged key-construction technique may specify an HMAC, a designated number of times to XOR the payload, an order in which secret strings are used to pad the hash value, or any other such parameters.

At 306, the data stream is parsed to produce a data chunk. According to various embodiments, the parser may compute a rolling hash function to identify chunk barriers. For instance, the parser may compute a rolling hash. When the hash is computed, it may be compared with one or more boundary condition criteria to determine whether the parsing of the data stream has reached a chunk boundary. For instance, a chunk boundary may be identified when a rolling hash value is a prime number, is divisible by a designated value, or has some other such mathematical property.

At 308, the data chunk is hashed to produce a hash value. According to various embodiments, the hash value may be computed using any suitable hashing technique. For instance, the hash value may be computed using MD5, SHA-1, SHA-256, SHA-512, Adler32, or another type of hashing function.

According to various embodiments, the hash value may be used as a fingerprint to identify the data chunk. For instance, the hash value may be used to determine whether the remote server has already stored a copy of the data chunk, as discussed with respect to FIG. 6.

At 310, the shared encryption key construction technique is applied to the hash value to produce a data chunk encryption key. As discussed with respect to operation 304, any of various encryption key construction techniques may be used so long as an encryption key for a data chunk can be constructed using the data chunk hash value and other information commonly available to both the client machine and the remote server.

At 312, the data chunk is encrypted using the data chunk encryption key. According to various embodiments, the data chunk may be encrypted using an encryption technique shared between the client device and the remote server. For instance, both the client device and the remote server may be configured to encrypt and decrypt data chunks using a symmetric-key encryption technique such as AES or any other suitable encryption technique.

At 314, a determination is made as to whether the data stream includes additional unparsed data. According to various embodiments, and as discussed with respect to operation 306, a data chunk may be parsed into any suitable number of data chunks. In this way, duplicate portions of the data stream may be identified for the purpose of deduplication. Accordingly, the data stream may be parsed into successive chunks so long as the data stream contains additional unparsed data.

At 316, the hash values and the encrypted data chunks are transmitted to the remote server as needed. According to various embodiments, data may be transmitted to the remote server as discussed with respect to FIG. 7. For example, a fingerprint or hash value may first be transmitted to the remote server to determine whether the data chunk is already stored on the remote server. Then, the data chunk itself may be transmitted if it is determined that the remote server does not already have a copy of the data chunk stored.

In particular embodiments, the remote server may be queried to determine whether the data chunk is stored at the remote server prior to encrypting the data chunk. In this way, computing resources at the client machine may be conserved, since the data chunk would not need to be encrypted unless it also is designated to be transmitted to the remote server.

Figure 4:
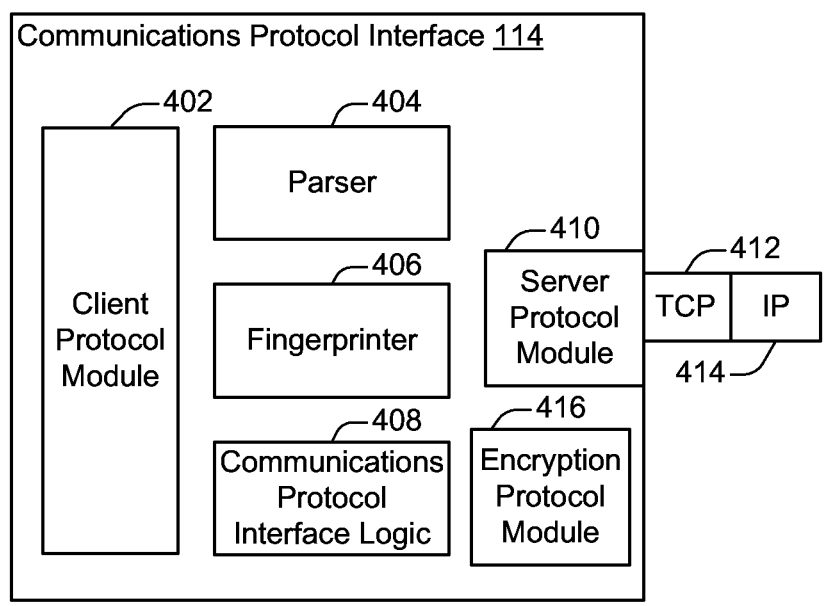
FIG. 4 illustrates an example of a communications protocol interface, configured in accordance with one or more embodiments.

FIG. 4 illustrates an example of a communications protocol interface 114, configured in accordance with one or more embodiments. The communications protocol interface 114 may be located at a client device and configured to facilitate potentially complex interactions between the client device and a remote server such as a networked storage system.

According to various embodiments, the communications protocol interface 114 includes a client protocol module 402, a parser 404, a fingerprinter 406, communications protocol interface logic 408, a server protocol module 410, and an encryption protocol module 416. The communications protocol interface 114 may be communicably coupled with TCP/IP interfaces 412 and 414, which may facilitate communications with a remote server.

In particular embodiments, the communications protocol interface 114 may be configured to appear to other modules at the client device as a conventional communications protocol interface while at the same time performing unconventional tasks such as client-side deduplication. The communications protocol interface 114 may perform such tasks at least in part by incorporating one or more components similar to those more conventionally found in a remote server.

According to various embodiments, the communications protocol interface 114 may implement a parser and fingerprinter substantially similar to those present at a networked storage system. Applying the same parsing and fingerprinting techniques at communications protocol interface 114 located at the client device may allow for operations such as client-side deduplication. For instance, rather than blindly sending data from the client device to a networked storage system when that data may be a duplicate of data already stored at the networked storage system, the communications protocol interface may first parse and fingerprint the data. Then, the client device may communicate with the networked storage system to determine whether the data needs to be sent. If the data does not need to be sent, then bandwidth may be reduced. If the data does need to be sent, then the data may be stored directly in storage at the networked storage system without necessarily performing server-side deduplication of the data. In this way, bandwidth usage and/or server-side resources may be conserved.

According to various embodiments, the client protocol module may be configured to allow the communications protocol interface 114 to communicate with other modules at the client device via a standard communications protocol. For instance, a processor at the client device may communicate with the communications protocol interface 114 via a protocol such as CIFS, OST, or NFS. The client protocol module 402 may be configured to process communications sent and received in such formats.

According to various embodiments, the parser 404 may be configured to receive a stream of data and separate the data into chunks for storage at a networked storage system. The parser 404 may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser. Then, the system can identify overlapping data portions in two similar data streams and avoid storing duplicate data chunks.

In particular embodiments, the parser 404 is identical to a parser implemented at the networked storage system in communication with the client device. By implementing the same parser at the client device, data can be parsed in the same way at the two devices. For instance, if the same data stream were to be parsed at the client-side and server-side parsers, the chunks that resulted from the different parsing operations may be identical.

In some embodiments, the fingerprinter 406 may generate a fingerprint of a chunk for purposes such as identification and deduplication. A fingerprint may also be referred to as a hash value or a checksum. For instance, the fingerprinter 406 may compute a hash value as discussed with respect to the method 300 shown in FIG. 3.

In particular embodiments, the fingerprinter 406 is identical to a fingerprinter implemented at a networked storage system in communication with the client device. By implementing an identical fingerprinter at the client device, data can be fingerprinted in the same way at the two devices. For instance, if the same chunks were to be fingerprinted at the client-side and server-side fingerprinter, the fingerprints that resulted from the different fingerprinting operations may be identical.

In some embodiments, the communications protocol interface logic 408 may be configured with instructions to facilitate various interactions between the client and a server such as a networked storage system. For instance, the communications protocol interface logic 408 may be configured with computer programming language instructions that govern the operation of the other components of the communications protocol interface 114. In one example, the communications protocol interface logic 408 may be configured to facilitate client-side data deduplication, as is discussed with respect to FIGS. 7 and 8.

According to various embodiments, the server protocol module 410 may be operable to communicate with a remote server such as a networked storage system. For instance, the server protocol module 410 may be configured to communicate using a proprietary protocol. The server protocol module 410 may be operable to perform operations such as determining whether a chunk having a particular fingerprint is stored at the networked storage system. Alternately, or additionally, the server protocol module 410 may be operable to store information to and/or retrieve information from the networked storage system. For example, the server protocol module 410 may be equipped for direct memory access at the networked storage system.

According to various embodiments, the encryption protocol module 416 may be configured to encrypt data chunks. For instance, the encryption protocol module 416 may be configured to perform the encryption operations discussed with respect to FIG. 3. These operations may include, but are not limited to: constructing an encryption key from a data chunk fingerprint and using the encryption key to encrypt the data chunk.

Figure 5:
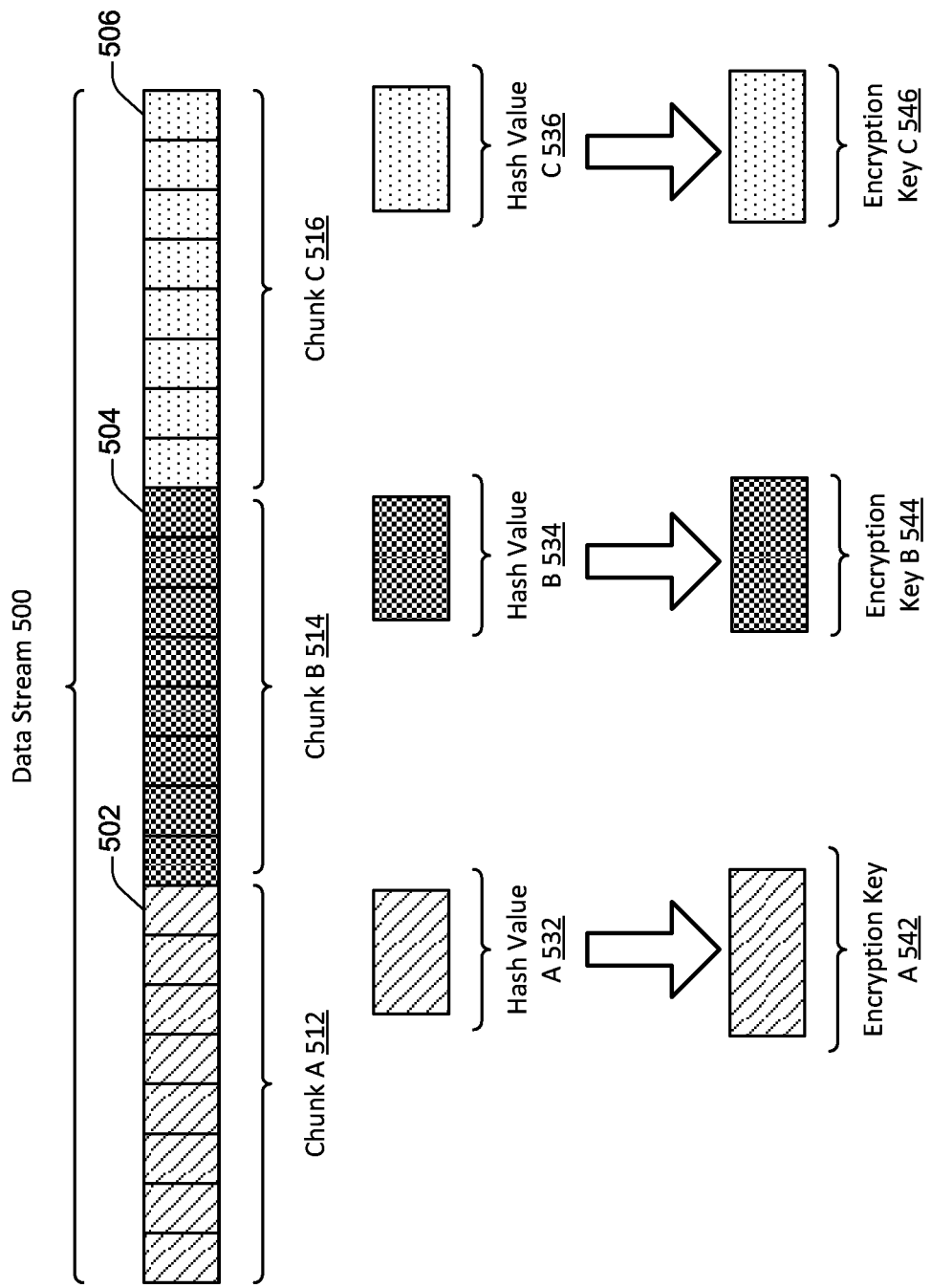
FIG. 5 illustrates a configuration of a data stream, presented in accordance with one or more embodiments.

FIG. 5 illustrates a configuration of data streams, presented in accordance with one or more embodiments. FIG. 5 includes data stream 500. The data stream is parsed into chunks 512, 514, and 516 by a parser. The data stream includes a plurality of data segments, including data segments 502-506. Each data segment may represent one or more bits, bytes, or any other unit of data size.

In some embodiments, a parser may parse a data stream into chunks. The parser may compute a rolling hash function to identify chunk barriers. For instance, the parser may compute a rolling hash that includes the data segment 502. When the hash is computed, it may be compared with one or more boundary condition criteria to determine whether the parsing of the data stream has reached a chunk boundary. For instance, a chunk boundary may be identified when a rolling hash value is a prime number, is divisible by a designated value, or has some other such mathematical property.

In the example shown in FIG. 5, the data segment 502 represents such a chunk boundary. Accordingly, the parser draws a boundary, and the data between the chunk boundary at the data segment 502 and the previous chunk boundary is designated as chunk A 512. The parser continues parsing the data stream 500 in this fashion, reaching a new boundary at the data segment 504 and designating the chunk B 754, and reaching another boundary at the data segment 506 and designating the chunk C 516.

According to various embodiments, each chunk may be hashed to produce a hash value after the chunk is parsed. For instance, the chunks shown in the data stream 500 are hashed to produce the hash value A 532, the hash value B 534, and the hash value C 536. The hashes may be used to construct fingerprints to identify the chunks.

According to various embodiments, an encryption key may be constructed for each data chunk by applying a cryptographic protocol. For instance, the chunks shown in FIG. 5 have been processed to produce the encryption key A 542, the encryption key B 544, and the encryption key C 546, which correspond respectively with chunk A 512, chunk B 514, and chunk C 516.

In particular embodiments, the cryptographic protocol used to construct the encryption keys may involve a secret shared with a remote server so that each chunk may be encrypted and/or decrypted either at the client machine or at the remote server. At the same type, the chunk-specific encryption key may be derived from an input value such as the chunk-specific hash value that is possessed by both the client machine and the remote server. In this way, the system may encrypt each chunk with a chunk-specific encryption key without needing to exchange each key between different systems.

It should be noted that although the data stream 500 shown in FIG. 5 includes only three data chunks, data streams frequently include many data chunks. For instance, a data stream may include thousands or millions of data chunks.

Figure 6:
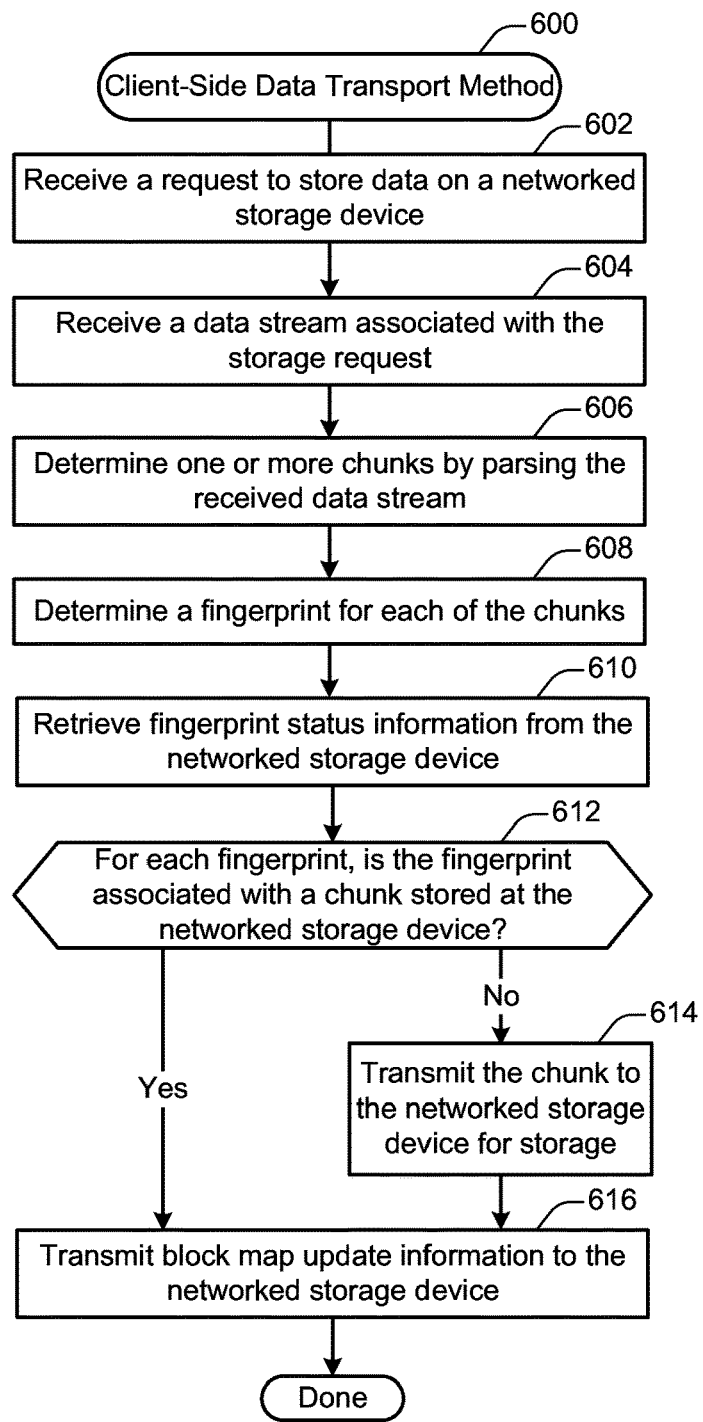
FIG. 6 illustrates an example of a client-side data transport method, performed in accordance with one or more embodiments.

FIG. 6 illustrates an example of a client-side data transport method 600, performed in accordance with one or more embodiments. The method 600 may be performed as part of a procedure in which data is transmitted from a client device to a networked storage system for storage. The method 600 may be performed on a client device, such as the client device 104 shown in FIG. 1.

In particular embodiments, the method 600 may be performed in association with a communications protocol interface configured to facilitate interactions between the client machine and the networked storage system. For instance, the method 600 may be performed in association with the communications protocol interface 114 shown in FIG. 1.

According to various embodiments, the method 600 may be used in conjunction with client-side and/or server-side encryption. For example, encryption techniques discussed with respect to FIG. 3 may be used to encrypt a chunk prior to transmission to the networked storage device at operation 614. As another example, encryption techniques discussed with respect to FIG. 3 may be used to encrypt a chunk at the networked storage device after transmission at operation 614.

At 602, a request to store data on a networked storage system is received. In some embodiments, the request may be received as part of a backup operation. For instance, the client device may initiate the request in order to store backup data on the networked storage system. Alternately, or additionally, the request may be received as part of an operation to store data for retrieval by other devices via a network.

According to various embodiments, the request may be generated by a processor or other module on the client device. The request may be received at a communications protocol such as the interface 114 shown in FIG. 1. For instance, the request may conform to a communications protocol for transmitting information via a network, such as a CIFS, OST, or NFS protocol.

In some implementations, the request may identify various metadata associated with a storage operation. For instance, the request may include one or more headers that identify one or more file names, file sizes, directories, or other such data.

At 604, a data stream associated with the storage request is received. According to various embodiments, the data stream may include data designated for storage. For instance, the data stream may include the contents of one or more files identified in the request received at operation 602.

At 606, one or more chunks are determined by parsing the received data stream. According to various embodiments, the parser may be configured in such a way that two data streams identical except for offset will be reliably parsed into the same chunks. Also, two similar and well-ordered data streams may be reliably parsed in a similar fashion. In this way, data streams may be parsed into chunks in a manner likely to frequently generate duplicate chunks when similar data is provided to the parser.

At 608, a fingerprint is determined for each of the chunks. According to various embodiments, the fingerprint may be determined as discussed with respect to FIGS. 3-6.

At 610, fingerprint status information from the networked storage system is retrieved. In some embodiments, the fingerprint status information may be retrieved by transmitting the fingerprints determined at operation 608 to the networked storage system. The fingerprints may be substantially smaller than the chunks with which they are associated. Thus, transmitting the fingerprints to the networked storage system may require substantially less bandwidth than transmitting the entire chunks.

In particular embodiments, the fingerprints may be transmitted as part of a request to the networked storage system to determine whether chunks associated with the fingerprints are stored at the networked storage system. When the request is received, the networked storage system may provide a response that indicates which of the chunks are stored on the networked storage system and/or which of the chunks are not stored on the networked storage system.

At 612, a determination is made for each fingerprint as to whether the fingerprint is associated with a chunk stored at the networked storage system. According to various embodiments, the determination may be made by processing one or more messages received from the networked storage system as part of the operation 610.

At 614, the chunk is transmitted to the networked storage system if it is determined that chunk fingerprint is associated with a chunk stored at the network storage device. According to various embodiments, the chunk may be stored at the networked storage system in a data store managed by the data store system.

At 616, block map update information is transmitted to the networked storage system. The block map may be used to track blocks stored at the networked storage system. According to various embodiments, the block map update information may be used for updating a block map at the networked storage system. The contents of the block map update information may vary based at least in part on the determination made at operation 610.

For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed.

As another example, if instead it is determined that the chunk is not already stored on the networked storage system, then the block map update information may include new block map and/or MDS entries that point to the storage location of the new chunk transmitted at operation 614. For instance, the block map entry may include a data store ID associated with the storage location of the new chunk.

FIG. 7 illustrates a server-side data storage method 700, performed in accordance with one or more embodiments. The method 700 may be performed at a networked storage system such as the system 102 shown in FIG. 1. The method 700 may be performed in conjunction with the method 700 discussed with respect to FIG. 5. For instance, the method 700 may be performed to facilitate the storage of data at a networked storage system, where the data is deduplicated at a client device from which the data originates.

In particular embodiments, the method 700 may be used to store deduplicated data in an encrypted state. For example, the method 700 may be used to receive data chunks that have been deduplicated and encrypted at a client machine. As another example, the method 700 may be used to receive unencrypted data chunks and then encrypt the data chunks prior to storage.

At 702, a message requesting the status of a fingerprint is received at the networked storage system. According to various embodiments, the request message received at operation 702 may include one or more fingerprints that are each associated with a data chunk. The message may be received from a client device in communication with the networked storage system via a network. For instance, the message may be transmitted as part of the information retrieval operation 710 discussed with respect to FIG. 7.

At 704, a determination is made as to the status for the fingerprint identified by the request message received at operation 702. According to various embodiments, determining the status of the fingerprint may involve evaluating whether a chunk corresponding with the fingerprint is stored at the networked storage system. The networked storage system may make this determination by comparing the fingerprint to entries in the block map at the networked storage system.

At 706, a fingerprint status message is transmitted to the client device. According to various embodiments, the fingerprint status message may indicate whether a chunk associated with the fingerprint is stored at the networked storage system. For instance, the fingerprint status message may indicate the results of the determination made at operation 704.

At 708, a determination is made as to whether the fingerprint is associated with a chunk stored at the networked storage system. According to various embodiments, the determination may be made based on the status information determined at operation 704.

At 710, if the chunk is not stored at the networked storage system, the chunk may be received from the networked storage system. At 712, the chunk is stored. In particular embodiments, the chunk may be transmitted as discussed with respect to operation 614 shown in FIG. 6.

At 712, a determination is made as to whether the data chunk is encrypted According to various embodiments, the networked storage system and client machine may be configured to apply the same techniques to produce an encryption key from a data chunk fingerprint. In this way, each data chunk may be encrypted with its own encryption key without needing to exchange the keys between the client machine and the networked storage system. In particular embodiments, each data chunk may be encrypted and/or decrypted either on the client machine or the networked storage system, depending on the configuration of the arrangement.

At 714, the data chunk is stored at the networked storage system. According to various embodiments, storing the data chunk may involve operations such as copying the data chunk to a designated location in a storage system.

At 716, a data chunk encryption key is constructed from the fingerprint. At 718, the data chunk is encrypted with the data chunk encryption key. According to various embodiments, the data chunk encryption key may be constructed and the data chunk may be encrypted as discussed with respect to FIGS. 3 and 5.

At 720, block map update information is received from the client device. According to various embodiments, the block map update information may be generated as discussed with respect to operation 616 shown in FIG. 6. For example, if it is determined that the chunk is already stored on the networked storage system, then the block map update information may include new block map and/or MDS entries that point to the existing chunk. In this way, references to the existing chunk are maintained and the chunk is not unlinked (i.e. deleted) even if other references to the chunk are removed. As another example, if instead it is determined that the chunk is not already stored on the networked storage system, then the block map update information may include new block map and/or MDS entries that point to the storage location of the new chunk stored at operation 714. For instance, the block map entry may include a data store ID associated with the storage location of the new chunk.

At 722, the block map is updated based on the received block map update information. According to various embodiments, updating the block map may involve entering the changes identified in operation 720 in the block map that tracks blocks stored at the networked storage system.

Figure 8:
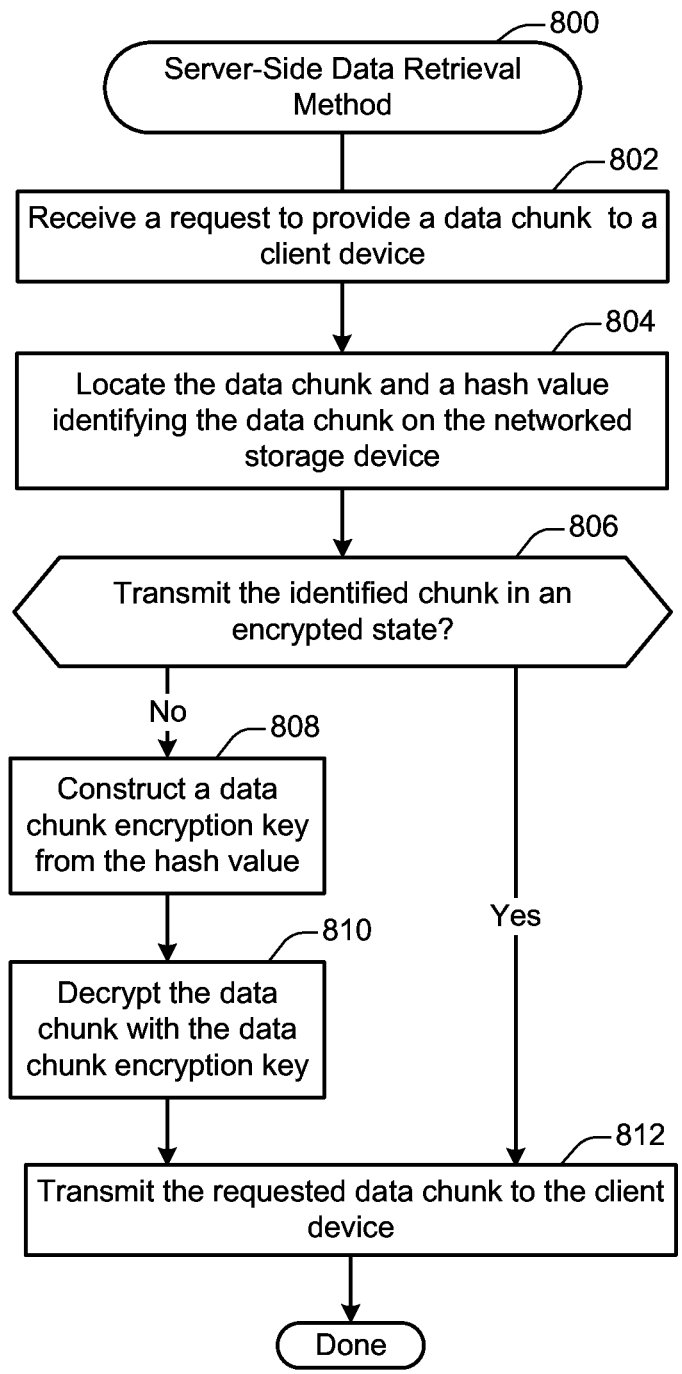
FIG. 8 illustrates a configuration of a sever-side data retrieval method, presented in accordance with one or more embodiments.

FIG. 8 illustrates an example of a method 800 of retrieving data stored at a networked storage system, performed in accordance with one or more embodiments. The method 800 may be performed in order to retrieve data encrypted via an encryption technique such as those discussed with respect to FIGS. 3 and 5 and transmitted to the networked storage system via techniques such as those discussed with respect to FIGS. 6 and 7.

At 802, a request is received to provide a data chunk to a client device. According to various embodiments, the request may be received as part of an operation to request various data from the networked storage device. For instance, a client device may transmit a request to receive a file or group of files that together include potentially many different data chunks.

At 804, the data chunk and hash value identifying the data chunk are located on the networked storage device. According to various embodiments, the hash value identifying the data chunk may be included in the request for the data chunk received at operation 802. Alternately, or additionally, the hash value may be located by determining a fingerprint value associated with a file, a directory, a set of files, or another arrangement of data requested by the client device.

In particular embodiments, the location of the data chunk may be determined by using the hash value as a fingerprint to look up the data chunk location in a dictionary. For instance, the networked storage device may maintain a block map that links data chunk fingerprints with data chunk locations on a storage medium. For example, each location may indicate a disk identifier, a location on a disk, and/or any other relevant information for retrieving the data chunk.

At 806, a determination is made as to whether to transmit the chunk in an encrypted state. According to various embodiments, the data chunk may be stored in an encrypted state at the networked storage device. Then, since the encryption key for encrypting and decrypting the data chunk may be constructed either at the client machine or at the networked storage device, the data chunk may be decrypted at either device.

In particular embodiments, either the client machine or the networked storage device may indicate that a data chunk is to be transmitted in an encrypted or decrypted state. For example, whether the data chunk is to be transmitted in an encrypted or decrypted state may depend on such factors as whether a secure communications link exists between the two machines and/or the available computing resources at the two machines.

In some implementations, the system may be pre-configured to transmit chunks in an encrypted or decrypted state. For instance, client devices located on the same network as the networked storage device may be configured to receive data chunks in a decrypted state, while client devices located outside the same network may be configured to receive data chunks in an encrypted state.

At 808, the data chunk encryption key is constructed from the hash value. According to various embodiments, the data chunk encryption key may be constructed in a fashion similar to that discussed with respect to operation 310 in FIG. 3 and operation 716 in FIG. 7. In this way, the data chunk may be stored in an encrypted state without needing to store the encryption key used to encrypt the data chunk. Instead, the data chunk encryption key may be constructed on demand based on the fingerprint associated with the data chunk.

At 810, the data chunk is decrypted with the data chunk encryption key. At 812, the requested data chunk is transmitted to the client device. According to various embodiments, the data chunk may be decrypted using the inverse of the techniques used to encrypt the data chunk. For instance, the data chunk may be decrypted by applying a symmetric key encryption algorithm to the encrypted data chunk using the data chunk encryption key.

Because various information and program instructions may be employed to implement the systems/methods described herein, the present invention relates to non-transitory machine-readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher-level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
   identifying a message from a client device, the message including a request for a status of a fingerprint value;
   determining the status for the fingerprint value at a networked storage device;
   sending a status message that includes the status for the fingerprint value to the client device;
   determining that the fingerprint value is not associated with a data chunk at the networked storage device;
   receiving the data chunk from the client device, wherein the data chunk is not encrypted;
   generating a data chunk encryption key based on the fingerprint value by combining the fingerprint value with a secret string, the secret string being pre-negotiated between the client device and the networked device;
   encrypting the data chunk with the data chunk encryption key; and
   storing the data chunk with the data chunk encryption key at the networked storage device.

2. The method of claim 1, wherein determining the status of the fingerprint value includes evaluating whether the data chunk corresponding with the fingerprint value is stored at the networked storage device.

3. The method of claim 2, wherein evaluating whether the data chunk corresponding with the fingerprint value is stored at the networked storage device comprises comparing the fingerprint value to entries in a block map at the networked storage device.

4. The method of claim 3 further comprising receiving the block map from the client device.

5. The method of claim 4 further comprising:
   receiving block map information from the client device; and
   updating the block map based on the block map information.

6. The method of claim 1, wherein generating the data chunk encryption key comprises concatenating the fingerprint value and the secret string.

7. The method of claim 6, wherein generating the data chunk encryption key further comprises applying a keyed-hash message authentication code (HMAC) to a concatenated fingerprint value and secret string to generate the data chunk encryption key.

8. A system, comprising:
   one or more processors; and
   a memory storing instructions that when executed by the one or more processors, cause the one or more processors to perform operations comprising:
      identify a message from a client device, the message including a request for a status of a fingerprint value;
      determine the status for the fingerprint value at a networked storage device;
      send a status message that includes the status for the fingerprint value to the client device;
      determine that the fingerprint value is not associated with a data chunk at the networked storage device;
      receive the data chunk from the client device, wherein the data chunk is not encrypted;
      generate a data chunk encryption key based on the fingerprint value by combining the fingerprint value with a secret string, the secret string being pre-negotiated between the client device and the networked device;
      encrypt the data chunk with the data chunk encryption key; and
      store the data chunk with the data chunk encryption key at the networked storage device.

9. The system of claim 8, wherein the operations to determine the status of the fingerprint value includes to evaluate whether the data chunk corresponding with the fingerprint value is stored at the networked storage device.

10. The system of claim 8, wherein the operations to evaluate whether the data chunk corresponding with the fingerprint value is stored at the networked storage device comprises to compare the fingerprint value to entries in a block map at the networked storage device.

11. The system of claim 10, the operations further comprising:
   receive block map information from the client device; and
   update the block map based on the block map information.

12. The system of claim 10, wherein the operations to generate the data chunk encryption key include to concatenate the fingerprint value and the secret string.

13. The system of claim 8, wherein the operations to generate the data chunk encryption key further comprises apply a keyed-hash message authentication code (HMAC) to a concatenated fingerprint value and secret string to generate the data chunk encryption key.

14. A non-transitory machine-readable medium comprising stored instructions, wherein the instructions, when executed, cause a machine to perform operations, comprising:
- identifying a message from a client device, the message including a request for a status of a fingerprint value;
- determining a status for the fingerprint value at a networked storage device;
- sending a status message that includes the status for the fingerprint value to the client device;
- determining that the fingerprint value is not associated with a data chunk at the networked storage device;
- receiving the data chunk from the client device, wherein the data chunk is not encrypted;
- generating a data chunk encryption key based on the fingerprint value by combining the fingerprint value with a secret string, the secret string being pre-negotiated between the client device and the networked device;
- encrypting the data chunk with the data chunk encryption key; and
- storing the data chunk with the data chunk encryption key at the networked storage device.

15. The non-transitory machine-readable medium of claim 14, wherein the operations to determine the status of the fingerprint value includes to evaluate whether a chunk corresponding with the fingerprint value is stored at the networked storage device.

16. The non-transitory machine-readable medium of claim 15, wherein the operations to evaluate whether the chunk corresponding with the fingerprint value is stored at the networked storage device comprises to compare the fingerprint value to entries in a block map at the networked storage device.

17. The non-transitory machine-readable medium of claim 16, the operations further comprising receive the block map from the client device.

18. The non-transitory machine-readable medium of claim 17, the operations further comprising:
- receive block map information from the client device; and
- update the block map based on the block map information.

19. The non-transitory machine-readable medium of claim 14, wherein the operations to generate the data chunk encryption key comprise to concatenate the fingerprint value and the secret string.

20. The non-transitory machine-readable medium of claim 19, wherein the operations to generate the data chunk encryption key further comprise to apply a keyed-hash message authentication code (HMAC) to the concatenated fingerprint value and secret string to generate the data chunk encryption key.

* * * * *